Patented Nov. 25, 1952

2,619,486

UNITED STATES PATENT OFFICE 2,619,486

DIALKOXYACETOGUANAMINES

John G. Erickson, Greenwich, Conn., assignor to American Cyanamid Company, New York, N. Y., a corporation of Maine No Drawing. Application September 23, 1950, Serial No. 186,488

5 Claims. (Cl. 260—249.9)

1

This invention relates to new and useful guanamine compounds and methods of preparing them.

These new compounds are dialkoxyacetoguanamines which conform to the general formula

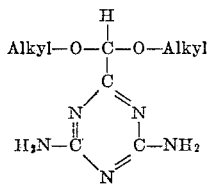

such as, for example, dimethoxyacetoguanamine, diethoxyacetoguanamine, di-n-butoxyacetoguanamine, diisobutoxyacetoguanamine, di-n-hexyloxyacetoguanamine, bis(2-ethylhexyloxy)acetoguanamine, di-n-decyloxyacetoguanamine, di-n-dodecyloxyacetoguanamine, and di-n-ocatadecyloxyacetoguanamine.

The dialkoxyacetoguanamines of the present invention are obtained in good yields by reacting dicyandiamide with a dialkoxyacetonitrile of the formula

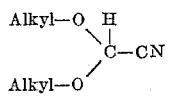

in the presence of an alkaline reacting catalyst in an inert organic solvent.

Compounds effective as catalysts for the reaction include the alkali metal hydroxides, cyanides, and alkoxides. The amount of catalyst employed is usually within the range of from 0.2% to 2.0%, based on the total weight of the reactants.

Suitable solvents in which the reaction may be carried out are the lower aliphatic monohydric alcohols and the lower mono-alkyl ethers of ethylene glycol such as, for example, ethyl alcohol, butyl alcohol, and the mono-methyl ether of ethylene glycol.

The reaction is preferably carried out at a temperature within the range of from about 50° C. to 150° C.

The dialkoxyacetonitriles utilized in the present process may be prepared by reacting together hydrocyanic acid and an orthoformic ester according to the method described in U. S. Patent No. 2,519,957.

2

The invention will be described in greater detail in conjunction with the following specific examples in which the parts are by weight.

Example 1

A mixture consisting of 30.3 parts of dimethoxyacetonitrile, 27.7 parts of dicyandiamide, 1 part of potassium hydroxide and 75 parts of the mono-methyl ether of ethylene glycol was stirred and heated slowly in a reaction vessel equipped with a thermometer, stirrer and reflux condenser. Heating of the vessel was discontinued at about 60° C., and thereafter the temperature of the reaction mixture rose rapidly to 100° C. and then very rapidly to about 132° C. (the boiling point of the solution). No attempt was made to check the exotherm by cooling, and after it had subsided the solution was refluxed for an additional 15 minutes. The reaction mixture was then cooled to about 15° C., and after standing for several hours crystallization occurred. The product was filtered, washed with ethyl alcohol and dried on a steam bath. 49.6 parts (89.4% yield) of dimethoxyacetoguanamine was obtained. After recrystallization from water, the compound was a white crystalline material melting at 208°-209° C.

Example 2

The procedure of Example 1 was employed using 25.8 parts of diethoxyacetonitrile, 18.5 parts of dicyandiamide, 0.66 part of potassium hydroxide and 30 parts of the mono-methyl ether of ethylene glycol. 40 parts (94% yield) of diethoxyacetoguanamine was obtained. The product was a white crystalline material melting at 195°-197° C.

Example 3

A mixture consisting of 13.0 parts of di-n-butoxyacetonitrile, 6.7 parts of dicyandiamide, 0.3 part of sodium hydroxide and 35 parts of the mono-methyl ether of ethylene glycol was stirred and heated slowly to about 110° C. Heating of the vessel was discontinued, and thereafter the temperature of the reaction mixture rose to 130° C. After the exotherm had subsided, heating and refluxing were continued for 15 minutes. The reaction mixture was then cooled to room temperature, poured into cold water, and the product recovered by filtration. 16.4 parts (87.2% yield) of di-n-butoxyacetoguanamine was obtained. After recrystallization from methyl alcohol, the compound was a white crystalline material melting at 166.5°–167.5° C.

*Example 4*

A mixture consisting of 38.2 parts of bis(2-ethylhexyloxy)-acetonitrile, 16 parts of dicyandiamide, 1 part of potassium hydroxide and 50 parts of the mono-methyl ether of ethylene glycol was stirred and heated to about 100° C. in a reaction vessel equipped with a thermometer, stirrer and reflux condenser. A mild exotherm set in and refluxing occurred. After the reaction subsided the clear amber solution was refluxed for an additional 15 minutes during which time some ammonia was evolved and some insolubles precipitated. No product precipitated on standing overnight at room temperature. The insolubles were filtered and the filtrate poured into water giving an oil which rapidly solidified to a white waxy solid. This product was washed twice with water and air-dried giving 47.5 parts (96% yield) of bis(2-ethylhexyloxy)acetoguanamine. After recrystallization from hexane, the compound was a white crystalline material melting at 115°–116° C.

The dialkoxyacetoguanamines prepared in accordance with this invention are particularly useful in resin formation by virtue of their ability to undergo self-condensation as well as condense with formaldehyde. These resinous products find wide application in a number of fields, for example in the production of lacquers, adhesives, impregnated paper and molded articles.

In previous work it was observed that dialkoxyacetonitriles were, to a large extent, cleaved to form hydrocyanic acid and derivatives of formic acid when heated in the presence of an alcohol and ammonia. Accordingly, it was surprising to find in the present process that the above cleavage did not occur but on the contrary dialkoxyacetoguanamines were readily obtained in excellent yields by heating dialkoxyacetonitriles with dicyandiamide in alcohols and in the presence of bases much stronger than ammonia, such as, for example, the alkali metal hydroxides.

While the invention has been described with particular reference to specific embodiments, it is to be understood that it is not to be limited thereto but is to be construed broadly and restricted solely by the scope of the appended claims.

I claim:

1. Dialkoxyacetoguanamines of the general formula

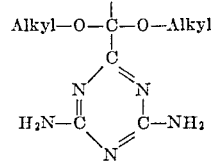

2. Dimethoxyacetoguanamine having the structural formula

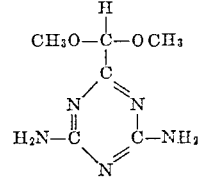

3. Diethoxyacetoguanamine having the structural formula

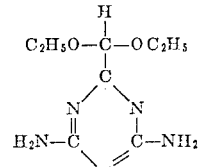

4. Di-n-butoxyacetoguanamine having the structural formula

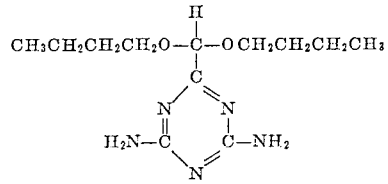

5. Bis(2-ethylhexyloxy)acetoguanamine having the structural formula

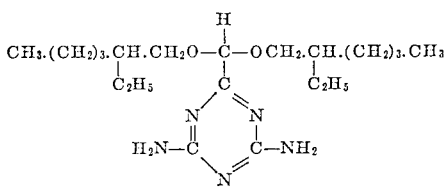

JOHN G. ERICKSON.

REFERENCES CITED

The following references are of record in the file of this patent:

UNITED STATES PATENTS

| Number | Name | Date |
| --- | --- | --- |
| 2,302,162 | Zerweck | Nov. 17, 1942 |
| 2,491,658 | Gresham | Dec. 20, 1949 |